(12) United States Patent
Norman et al.

(10) Patent No.: US 8,101,556 B2
(45) Date of Patent: Jan. 24, 2012

(54) TREATMENT FLUIDS FOR REDUCTION OF WATER BLOCKS, OIL BLOCKS, AND/OR GAS CONDENSATES AND ASSOCIATED METHODS

(75) Inventors: Lewis R. Norman, Duncan, OK (US);
Bobby E. Hall, Thornton, CO (US);
Rajesh K. Saini, Duncan, OK (US);
Anindya Ghosh, Little Rock, AR (US)

(73) Assignee: Halliburton Energy Services, Inc., Duncan, OK (US)

( * ) Notice: Subject to any disclaimer, the term of this patent is extended or adjusted under 35 U.S.C. 154(b) by 82 days.

(21) Appl. No.: 12/387,849

(22) Filed: May 8, 2009

(65) Prior Publication Data
US 2010/0285999 A1    Nov. 11, 2010

(51) Int. Cl.
| | |
|---|---|
| C09K 8/60 | (2006.01) |
| C09K 8/68 | (2006.01) |
| C09K 8/524 | (2006.01) |
| C09K 8/584 | (2006.01) |
| C23F 11/14 | (2006.01) |
| C23F 11/04 | (2006.01) |
| E21B 43/16 | (2006.01) |
| E21B 43/22 | (2006.01) |
| E21B 43/26 | (2006.01) |

(52) U.S. Cl. ........ 507/240; 507/203; 507/219; 507/239; 507/244; 507/246; 507/248; 507/261; 166/268; 166/270.1; 166/305.1

(58) Field of Classification Search .............. 507/219, 507/203, 239, 240, 244, 246, 248, 261; 166/268, 166/270.1, 305.1
See application file for complete search history.

(56) References Cited

U.S. PATENT DOCUMENTS

| | | | |
|---|---|---|---|
| 2,194,906 A | | 3/1940 | Krzikalla et al. |
| 2,761,843 A | * | 9/1956 | Brown .......................... 507/240 |
| 3,349,032 A | * | 10/1967 | Krieg ............................ 166/275 |
| 5,196,135 A | | 3/1993 | Merianos |
| 6,025,302 A | * | 2/2000 | Pakulski ........................ 507/90 |
| 6,462,096 B1 | * | 10/2002 | Dino et al. ..................... 516/101 |
| 6,929,069 B2 | | 8/2005 | Hinkel et al. |
| 6,972,274 B1 | * | 12/2005 | Slikta et al. ................... 507/240 |
| 2003/0166472 A1 | | 9/2003 | Pursley et al. |
| 2004/0067855 A1 | | 4/2004 | Hughes et al. |
| 2006/0025321 A1 | * | 2/2006 | Treybig et al. ................ 510/382 |
| 2007/0029085 A1 | | 2/2007 | Panga et al. |

FOREIGN PATENT DOCUMENTS

| | | |
|---|---|---|
| WO | WO 96/06603 | 3/1996 |
| WO | WO03074833 | 9/2003 |
| WO | WO 2007/056284 | 5/2007 |

OTHER PUBLICATIONS

SPE 82214.
Beger et al., Mehrfunktionelle N-Tenside; Tenside Surfactants Detergents, vol. 29, Dec. 31, 1992, pp. 271-277, XP001538885.
Bolle et al., Preparation de derives ammoniums quaternaires; Mem. Services Chim, Etat., vol. 38, Dec. 31, 1953, pp. 147-157, XP002583598.
Partial Search Report for PCT/GB2010/000575 dated Jun. 11, 2010.
International Search Report and Written Opinion for PCT/GB2010/000575 dated Feb. 10, 2011.

* cited by examiner

*Primary Examiner* — Timothy J. Kugel
*Assistant Examiner* — Atnaf Admasu
(74) *Attorney, Agent, or Firm* — Robert A. Kent; McDermott Will & Emery LLP

(57) ABSTRACT

The present invention provides treatment fluids useful for subterranean operations, and more particularly, in at least one aspect, a treatment fluid that comprises a carrier fluid and a cationic surfactant comprising a cationic head group, a polar group attached to the head group, and a hydrophobic group that is either a saturated or unsaturated, branched or straight chain alkyl, and comprises about 6 carbons to about 22 carbons. The treatment fluids of the present invention are at least suitable for use as a remedial treatment for the reduction of existing water blocks, oil blocks, and/or gas condensates.

24 Claims, 10 Drawing Sheets

Diagram of the apparatus used for measuring the flow of fluids through the sand pack.

TREATMENT FLUIDS FOR REDUCTION OF WATER BLOCKS, OIL BLOCKS, AND/OR GAS CONDENSATES AND ASSOCIATED METHODS

BACKGROUND OF THE INVENTION

The present invention relates to fluids useful for subterranean operations, and more particularly, to treatment fluids and their associated methods of use for the reduction of water blocks, oil blocks, and/or gas condensates.

Various procedures have been developed and utilized that may increase the flow of hydrocarbons from hydrocarbon-containing subterranean formations penetrated by well bores. For example, a conventional production stimulation technique may involve creating and extending fractures in the subterranean formation to provide flow channels therein through which hydrocarbons flow from the formation to the well bore. The fractures may be created by introducing a fracturing fluid into the formation at a rate sufficient to exert a sufficient pressure on the formation to create and extend fractures therein. Solid fracture proppant materials, such as sand, may be suspended in the fracturing fluid so that upon introducing the fracturing fluid into the formation and creating and extending fractures therein, the proppant material may be carried into the fractures and deposited therein. Such a treatment may prevent the fractures from closing due to subterranean forces when the introduction of the fracturing fluid has ceased.

Water-based fluids are typically used to fracture a subterranean formation, and when treated with conventional surfactants to recover the fracturing fluid, typically only a small portion of the fracturing fluid can be recovered. The aqueous fluid retained in the formation may increase the water saturation level of the formation, adversely affecting, among other things, the relative permeability to hydrocarbon flow, effective flow area, fracture length and the well productivity. The water saturation levels of the formation may also increase due to, among other things, cross flow from water-bearing zones or other regions of the formation and filtrate invasion from water-based drilling fluids. In the latter case, the water saturation level of the formation near the well bore may be especially high, which may lower the relative permeability of the formation and thus the production of hydrocarbons by water-block formation.

In gas wells, in addition to these sorts of water blocks, liquid hydrocarbons may accumulate and lower the permeability of the formation rocks. Moreover, liquid hydrocarbons that condense out of the gas phase due to the decline in pressure below the dew point pressure of the gas also may hinder the production of hydrocarbons. Commercially available fluid treatments for the reduction of water blocks, oil blocks, and/or gas condensates such as amine oxides are not satisfactory, inter alia, because of their limited temperature range usability. Others, such as TEFLON®, are not optimal because of the high cost associated with their use. Examples of other commercially available fluid treatments for reducing water blocks, oil blocks, and/or gas condensates include materials made up of fluorocarbons. Treatment fluids that contain fluorocarbons can pose an undesirable safety hazard.

Several conventional surfactants have been used in attempts to alleviate these problems. Surfactants, which contain a hydrophilic and a hydrophobic group, are mixed with a treatment fluid, inter alia, to lower the surface tension of the fluid in order to facilitate the cleanup and mitigate formation damage caused by either water blocks, oil blocks, or gas condensates. In addition to lowering surface tension, surfactants also may change the formation wetability. This results from a decrease in the capillary pressure of the flow channels in the subterranean formation, which may be accomplished by, among other things, changing the contact angle so that clean-up process is facilitated, and the hydrocarbons can flow with less resistance.

Cationic, anionic and zwitterionic surfactants may be used to enhance the production of hydrocarbons. Chemical systems other than surfactants used to accomplish the same objective may include finely dispersed emulsions. In recent years, use of these emulsions to improve gas productivity has been gradually increasing.

SUMMARY OF THE INVENTION

The present invention relates to fluids useful for subterranean operations, and more particularly, to treatment fluids and their associated methods of use for the reduction of water blocks, oil blocks, and/or gas condensates.

In one embodiment, the present invention provides a method of treating a well bore comprising: introducing a treatment fluid into a subterranean formation, wherein the treatment fluid comprises a carrier fluid and a cationic surfactant, the a cationic surfactant comprising a cationic head group, a polar group attached to the head group, and a hydrophobic group that is either a saturated or unsaturated, branched or straight chain alkyl, and comprises about 6 carbons to about 22 carbons.

In another embodiment, the present invention provides a method comprising: providing a treatment fluid comprising: a carrier fluid; and a cationic surfactant comprising a cationic head group, a polar group attached to the head group, and a hydrophobic group that is either a saturated or unsaturated, branched or straight chain alkyl, and comprises about 6 carbons to about 22 carbons; introducing the treatment fluid into a subterranean formation at or above a pressure sufficient to create or enhance one or more fractures in the subterranean formation.

In yet another embodiment, the present invention provides a treatment fluid comprising: a carrier fluid; and a cationic surfactant comprising a cationic head group, a polar group attached to the head group, and a hydrophobic group that is either a saturated or unsaturated, branched or straight chain alkyl, and comprises about 6 carbons to about 22 carbons.

Other features and advantages of the present invention will be readily apparent to those skilled in the art upon a reading of the description of preferred embodiments which follows.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to fluids useful for subterranean operations, and more particularly, to treatment fluids and their associated methods of use for the reduction of water blocks, oil blocks, and/or gas condensates.

As will be appreciated by those of ordinary skill in the art, embodiments of the treatment fluids and methods of the present invention may be used in any subterranean formation containing natural gas. This gas, for example, may be compressed gas contained within formation pores and/or gas that is adsorbed onto surfaces within the formation. By way of example, the techniques described herein may be used to treat coal beds to improve the recovery of natural gas found therein. Those of ordinary skill in the art will appreciate that gas found in coal beds is commonly referred to as "coal bed methane."

Although many advantages of the present invention are not mentioned or alluded to herein, at least in some embodiments, the treatment fluids and methods of the present invention may be used to enhance the flow of hydrocarbons through a subterranean formation. For instance, the treatment fluids and methods of the present invention may be used in such a way that, among other things, may alter the wetability of the subterranean formation and/or enhance the flow of hydrocarbons through the subterranean formation. By way of example, the treatment fluids and methods may improve oil and/or gas production by reducing the occurrence of water blocks, oil blocks, and/or gas condensates in the treated portion of the formation. Other advantages will be apparent to one of ordinary skill in the art.

In accordance with certain embodiments of the present invention, the treatment fluids generally comprise a carrier fluid and a cationic surfactant comprising a cationic head group, a polar group attached to the head group, and a hydrophobic group that is either a saturated or unsaturated, branched or straight chain alkyl, and comprises about 6 carbons to about 22 carbons. The carrier fluid of embodiments of the treatment fluids of the present invention may be any fluid comprising an aqueous component. Suitable aqueous components include, but are not limited to, freshwater, saltwater, brine (e.g., saturated or unsaturated saltwater), or seawater. Generally, the aqueous component may be from any source, provided that it does not contain components that may undesirably affect other components in the treatment fluid. Suitable carrier fluids may include, for example, aqueous fluids and foams. One of ordinary skill in the art, with the benefit of the present disclosure, will recognize suitable carrier fluids for use in the treatment fluids and methods of the present invention.

Figure 7:
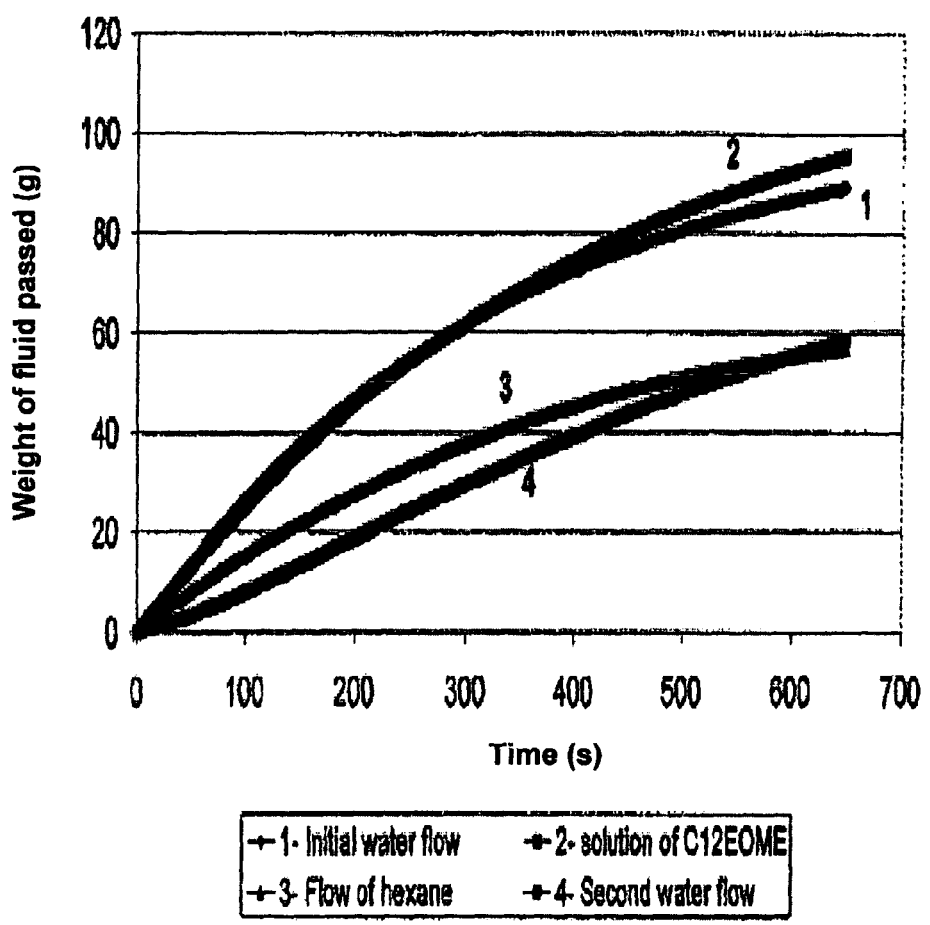
FIG. 7 shows a plot of flow rate of solutions comprising 0.2% of surfactants (100 mL) through a small column of Oklahoma No. 1 sand.

The potential effect of a surfactant as to its ability to reduce the occurrence of water blocks, oil blocks, and/or gas condensates in a treated portion of the formation can be examined by measuring the initial flow rate of fluids in a sand pack column. By way of example, Curve 3 in FIG. 7 illustrates the flow of an oil-based fluid through a sand pack after that sand pack has been treated with a cationic surfactant discussed herein. It is believed that without treatment with the cationic surfactant, that the oil-based fluid would not pass through the sand column under the conditions described below in paragraph [0066]. As illustrated in Curve 3, after treatment, the oil-based fluid does flow through the column. Additionally, the flow of water can be examined by comparing the initial water flow rate through the column as shown in Curve 1 to the second water flow rate in the column in Curve 4. Although the second water flow rate is lower than the first, this multipassing of fluids suggests that the cationic surfactants of the present invention would be successful in removing water blocks, oil blocks, and/or gas condensates.

By way of example, the cationic surfactant may improve oil and/or gas production by reducing the occurrence of water blocks and/or gas condensates in the treated portion of the formation. Without being limited by theory, once introduced into the formation, the cationic surfactant is believed to adsorb onto rock surfaces in the treated portion of the formation. Once adsorbed, it is believed that the cationic surfactant may increase the contact angle between water and formation surfaces. By way of example, it believed that the contact angle may be increased from less than 90° to an angle of about 90°. This may directly or indirectly lead to reduced capillary pressure in the porosity of the formation. Reduced capillary pressure may lead to increased water-flow rates. As will be appreciated, improved water-flow rates should allow a reduction in existing water blocks and/or oil blocks, as well as a reduction in the formation of water and/or oil blocks. Moreover, it is also believed that the cationic surfactant may reduce the tendency of the formation to imbibe water in the gas flow channels. In other words, it is believed that the cationic surfactant may reduce the water-imbibition rates of the treated portion of the formation. As such, it is believed that treatment of the formation with the cationic surfactant may reduce the formation of water and/or oil blocks in the treatment portion.

The cationic surfactant of embodiments of the treatment fluids of the present invention may be a cationic surfactant comprising a cationic head group, a polar group attached to the head group, and a hydrophobic group that is either a saturated or unsaturated, branched or straight chain alkyl, and comprises about 6 carbons to about 22 carbons. In certain embodiments, the polar group may include ethers, amides or amines. Suitable ethers may include, but are not limited to, end capped ethylene oxide, end capped propylene oxide and any derivative thereof. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "derivative" also includes copolymers, terpolymers, and oligomers of the listed compound.

In certain embodiments, the cationic surfactant of the treatment fluids of the present invention may be a surfactant of the following general formula:

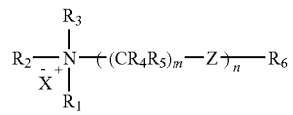

Structure 1 where $R_1$ comprises a hydrogen atom or an alkyl group comprising 1 to about 6 carbon atoms, $R_2$ is the same or different group comprising a hydrogen atom, an alkyl group comprising 1 to about 6 carbon atoms, $R_3$ comprises a hydrophobic alkyl group, alkenyl group, alkyl or alkenyl amide or ether group, branched or unbranched, comprising about 6 to about 22 carbon atoms, $R_4$ comprises a hydrogen atom, an alkyl group comprising 1 to about 6 carbon atoms, $R_5$ is the same or different group comprising a hydrogen atom or an alkyl group comprising 1 to about 6 carbon atoms, m is about 1 to about 6, n is 1 to about 6, Z is either O, NH or S, $X^-$ is an anion such Cl, Br, I, tosylate, mesylate, sulfate etc., and $R_6$ is hydrogen atom, an alkyl group comprising 1 to about 6 carbon atoms, or $-(CR_4R_5)_m-N^+R_1R_2R_3.X^-$ where all the symbols are described previously.

In certain embodiments, the cationic surfactant of the treatment fluids of the present invention may be a surfactant of the general formula:

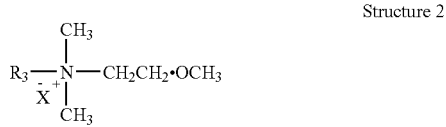

Structure 2 where $R_3$ comprises an alkyl group that is either saturated or unsaturated comprising about 8 to about 14 carbon atoms and $X^-$ is an anion. In certain embodiments, $R_3$ may be an alkyl group comprising 10 carbon atoms.

In certain embodiments, the cationic surfactant of the treatment fluids of the present invention may be a surfactant of the general formula:

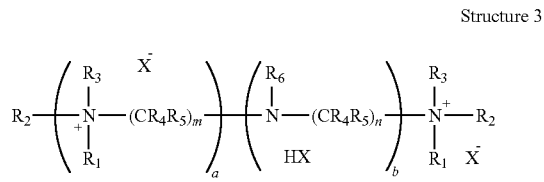

Structure 3 where $R_1$ comprises a hydrogen atom, an alkyl group comprising 1 to about 6 carbon atoms, end capped ethylene oxide or its derivative, end capped propylene oxide or its derivatives; $R_2$ is the same or different group comprising hydrogen atom, an alkyl group comprising 1 to about 6 carbon atoms, end capped ethylene oxide or its derivative, end capped propylene oxide or its derivatives, where $R_4$ and $R_5$ are the same or different groups comprising a hydrogen atom, an alkyl group comprising 1 to about 6 carbon atoms, where $R_3$ and $R_6$ are the same or different groups comprising a hydrogen atom, an alkyl, an alkenyl, an alkenylamide or an alkylamide hydrophobic group, linear or branched, that is either comprising about 6 to about 22 carbon atoms, m is about 1 to about 6, n is 1 to about 6, the ratio of a to b is from about 1:4 to about 4:1, a and b are from 1 to about 200, and $X^-$ is an anion such as Cl, Br, I, tosylate, mesylate, sulfate etc. The above structure could be linear or branched. The above molecule may be block or random.

One of the surfactants comprising the above structure can be synthesized by reacting linear polyethylenimine (PEI) with a molecular weight of 423 with a dodecyl bromide. The amount of dodecyl bromide added to the PEI is enough to react with 50% of the nitrogens in the PEI oligomer. This PEI surfactant can be used for the prevention of water and oil blocks. The surfactant further can be reacted with alkylhalides or other materials to quarternize nitrogen. The PEI surfactants have multiple charged or uncharged groups that bind to the formation at multiple sites and are very difficult to wash away in produced water or gas. The N present in the PEI surfactant can be a primary, secondary, tertary or quaternary nitrogen. The number of long chain alkyl group on PEI are chosen in such a way so that the desired balance between hydrophobic and hydrophilic part is obtained so that it allow water and oil/gas to pass through a porous medium with minimum obstruction. The PEI surfactant can also be synthesized by reacting with long chain carboxylic acid halides.

Sufficient concentrations of a suitable cationic surfactant may be present in the treatment fluids of the present invention to provide a desired effect. The amount of the cationic surfactant to include in the treatment fluid depends on a number of factors including, but not limited to, the composition and the porosity of the subterranean formation. In some embodiments, the cationic surfactant may be present in a treatment fluid of the present invention in an amount in the range of about 0.01% to about 10% by weight of the treatment fluid. In some embodiments, the cationic surfactant may be present in an amount in the range of about 0.05% to about 0.5% by weight of the treatment fluid. In certain embodiments of the present invention, the cationic surfactant may be provided in a concentrated solution prior to its combination with the other components necessary to form a treatment fluid of the present invention.

The treatment fluids of the present invention may further comprise particulates, such as proppant particulates or gravel particulates. Such particulates may be included in the treatment fluids of the present invention, for example, when a gravel pack is to be formed in at least a portion of the well bore or a proppant pack is to be formed in one or more fractures in the subterranean formation. Particulates suitable for use in the present invention may comprise any material suitable for use in subterranean operations. Suitable materials for these particulates may include, but are not limited to, sand, bauxite, ceramic materials, glass materials, polymer materials, TEFLON® (polytetrafluoroethylene) materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulate size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

In some embodiments, other additives may optionally be included in the treatment fluids of the present invention. Examples of such additives may include, but are not limited to, gelling agents, crosslinking agents, salts, additional surfactants (e.g., non-ionic surfactants), fluid loss control additives, acids, gases (e.g., nitrogen, carbon dioxide), surface modifying agents, tackifying agents, foamers, corrosion inhibitors, additional scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, wetting agents, and coating enhancement agents. A person of ordinary skill in the art, with the benefit of this disclosure, will recognize when such optional additives should be included in a treatment fluid used in the present invention, as well as the appropriate amounts of those additives to include.

An embodiment of a method of the present invention comprises introducing a treatment fluid into a subterranean formation, wherein the treatment fluid comprises a carrier fluid and a cationic surfactant comprising a cationic head group, a polar group attached to the head group, and a hydrophobic group that is either a saturated or unsaturated, branched or straight chain alkyl, and comprises about 6 carbons to about 22 carbons. In certain embodiments, the treatment fluid may be introduced into the subterranean formation as a remedial treatment for the reduction of existing water blocks, oil blocks, and/or gas condensates. A remedial treatment is a treatment that is used to treat existing water blocks, oil blocks, and/or gas condensates, or other issues present in the subterranean environment. It is believed that the presence of the cationic surfactant in the subterranean formation should also reduce the subsequent formation of water blocks, oil blocks, and/or gas condensates in the formation.

In addition, the treatment fluids and methods of the present invention may be useful in other operations performed in subterranean formations. Such operations include, but are not limited to, fracturing, drilling, acidizing, and other workover operations. For example, it may be desirable to include the cationic surfactant in a fluid used in fracturing, drilling, or acidizing to reduce water blocks, oil blocks, and/or gas condensates that may invade the production zone. One of ordinary skill in the art, with the benefit of the present disclosure, will recognize suitable operations in which the treatment fluids of the present invention may be used.

In certain embodiments, the treatment fluids of the present invention may be used in fracturing operations in a subterranean formation. In these embodiments, a treatment fluid of the present invention may be pumped into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluids of the present invention used in these embodiments optionally may comprise particulates, often referred to as "proppant particulates," that may be deposited in the fractures. The proppant particulates may function, inter alia, to prevent one or more of the fractures from fully closing upon the release of hydraulic pressure, forming conductive channels through which fluids may flow to the well bore. Once at least one fracture is created and the proppant particulates are substantially in place, the viscosity of the treatment fluid of the present invention may be reduced (e.g., through the use of a gel breaker, or allowed to reduce naturally over time) to allow it to be recovered.

In certain embodiments, the treatment fluids of the present invention may be used in drilling operations in a subterranean formation. In certain embodiments, such drilling operations may include drilling a well bore into a subterranean formation. Drilling the well bore may be accomplished by using drilling equipment, such as a drill string and a drill bit, along with the drilling fluid. Drilling operations may include any suitable technique for forming a well bore that penetrates a subterranean formation. Examples of suitable techniques for forming a well bore may include, but are not limited to, rotary drilling and cable-tool drilling. Other techniques for forming a well bore may be used, but generally to a lesser extent. Rotary drilling operations typically involve attaching a drill bit on a lower end of a drill string to form a drilling tool and rotating the drill bit along with the drill string into a subterranean formation to create a well bore through which subsurface formation fluids may be produced. As the drill bit penetrates the subterranean formation, additional joints of pipe may be coupled to the drill string. In another method of drilling, coiled tubing may be used instead of jointed pipe and the drill bit may be rotated using a downhole motor.

In certain embodiments, the treatment fluids of the present invention may be used in acidizing and/or acid fracturing operations. In these embodiments, a portion of the subterranean formation is contacted with a treatment fluid of the present invention comprising one or more organic acids (or salts thereof) and one or more inorganic acids (or salts thereof), which interact with subterranean formation to form "voids" (e.g., cracks, fractures, wormholes, etc.) in the formation. After acidization is completed, the treatment fluid of the present invention (or some portion thereof) may be recovered to the surface. The remaining voids in the subterranean formation may, inter alia, enhance the formation's permeability, and/or increase the rate at which fluids subsequently may be produced from the formation. In certain embodiments, a treatment fluid of the present invention may be introduced into the subterranean formation at or above a pressure sufficient to create or enhance one or more fractures within the subterranean formation. In other embodiments, a treatment fluid of the present invention may be introduced into the subterranean formation below a pressure sufficient to create or enhance one or more fractures within the subterranean formation.

To facilitate a better understanding of the present invention, the following examples of the preferred embodiments are given. In no way should the following examples be read to limit, or define, the scope of the invention.

EXAMPLES

Several cationic surfactants that may be useful in the treatment fluids and methods of the present invention can be synthesized according to methods involving one step or two steps. The synthesis may be performed either in presence of solvents or without any solvent, as desired.

Figure 1:
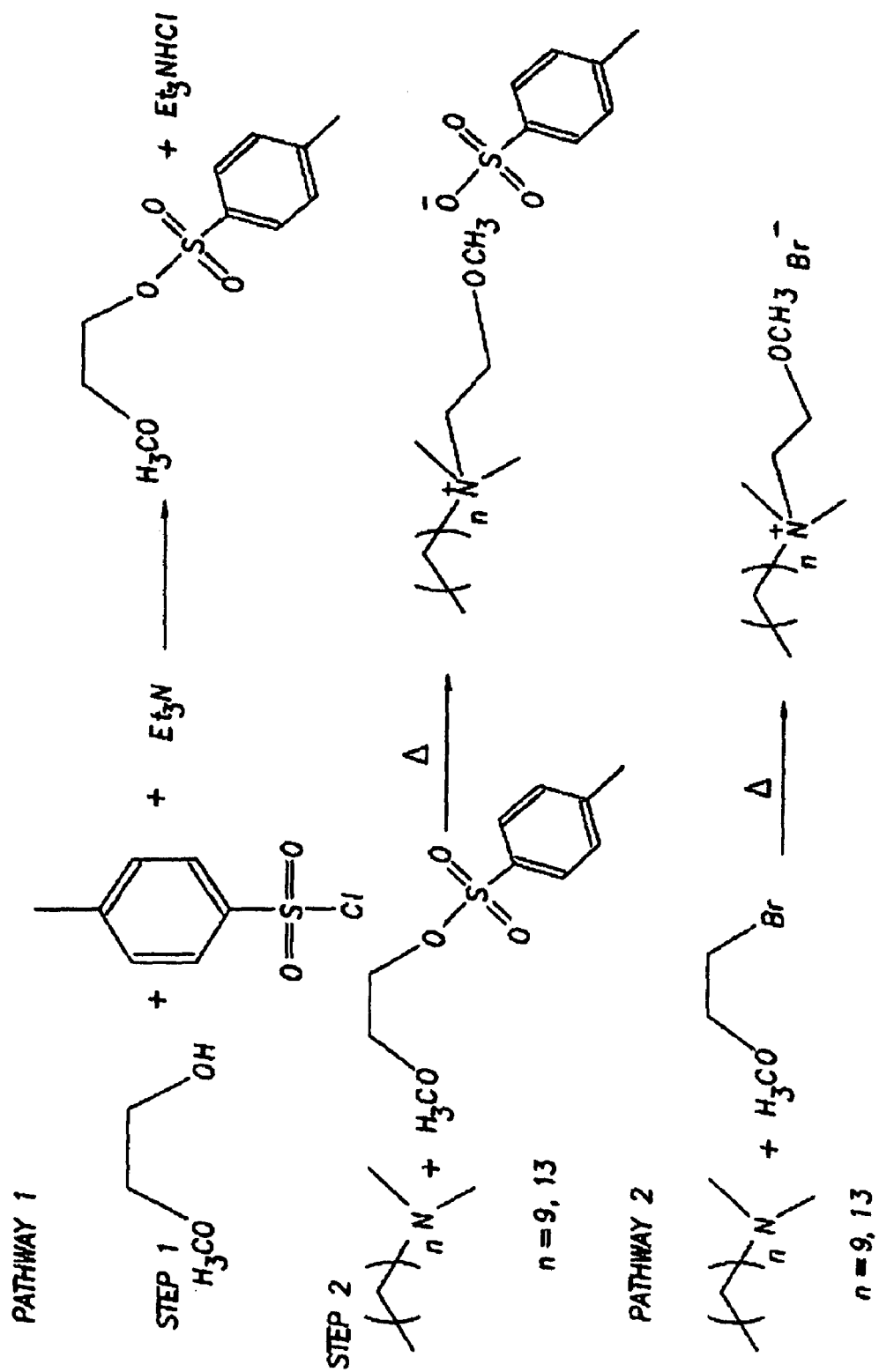
FIG. 1 shows two examples of synthetic methods of preparing surfactants useful in the treatment fluids and methods of the present invention.

A tertiary amine with an alkyl group from 6 carbons to 22 carbons was reacted with monomethyl capped ethylene glycol or propylene glycol as described below. The reaction schemes are given in FIG. 1 for a few representative examples.

Synthesis of Surfactants Using Pathway 1 with Tosylate Counterion

N-(2-methoxyethyl)-N,N-dimethyldecan-1-aminium 4-methylbenzenesulfonate (with C10 alkyl group)

Step 1: 2-methoxyethanol (26.3 mmol, 2 g) and tosyl chloride (28.9 mmol, 5.51 g) were mixed together with 25 mL dry tetrahydrofuran in a round bottom flask. The reaction mixture was purged with nitrogen gas and cooled to 0° C. using an ice bath. Triethylamine (28.9 mmol, 2.93 g) was added drop wise to the reaction mixture for 20 minutes. The formation of white precipitate was observed. The reaction mixture was brought to room temperature and stirred for another 10 hours. The reaction mixture was then filtered to remove precipitate, and the filtrate was evaporated to yield a viscous liquid. The liquid was dissolved in 200 mL dichloromethane and washed with 5% (3×100 mL) sodium bicarbonate ($NaHCO_3$) solution. The dichloromethane layer was dried with sodium sulfate ($Na_2SO_4$) and evaporated to yield a viscous yellowish liquid as the desired product.

Step 2: The reaction was performed in an inert atmosphere. N,N-dimethyldecylamine (16.21 mmol, 3.7 g) and 2-methoxyethyl 4-methylbenzenesulfonate (16.21 mmol, 3.71 g) prepared in the previous step were mixed together in a round bottom flask. Dioxane (10 mL) was added to the reaction mixture. The reaction mixture was heated at 75° C. for 18 hours. The solvent was removed by a rotoevaporator, and the remaining viscous liquid was cooled and dried. A white solid was obtained as N-(2-methoxyethyl)-N,N-dimethyldecan-1-aminium 4-methylbenzenesulfonate. The reaction was also performed in absence of any solvent and the desired product was obtained in quantitative yield. Similarly other surfactants were synthesized following the above-mentioned method.

Synthesis of Surfactants Using Pathway 2 with Br Counterion

N-(2-methoxyethyl)-N,N-dimethyldecan-1-aminium bromide (with $C_{10}$ alkyl chain)

Step 1: The reaction was performed in an inert atmosphere. N,N-dimethyldecylamine (16.21 mmol, 3.7 g) and 2-bromoethyl methyl ether (16.21 mmol, 2.25 g) were mixed together in a round bottom flask. Acetone (10 mL) was added to the reaction mixture. The reaction mixture was heated to reflux for 8 hours. The solvent was removed by a rotoevaporator and remaining viscous liquid was cooled and dried. A brownish white solid was obtained as N-(2-methoxyethyl)-N,N-dimethyldecan-1-aminium bromide. By using this method other surfactants were also synthesized. Other surfactants were also synthesized by heating in dioxane at 75° C. for 10 hours instead of using acetone.

Oligomeric poly(ethylene imine) (MW 423, 6 g, 14.18 mmol; Aldrich), dodecylbromide (17.68 g, 70.92 mmol) and chloroform/methanol (50 ml; 1:1 mixture) were placed in a 250 ml round bottom flask. The contents were refluxed with stirring in an oil bath maintained at 85° C. for 24 hours. The volatiles were evaporated under vacuum to obtain viscous brownish oil. The material is used as such for the subsequent tests without any purification. This oligomer is designated as $5C_{12}PEI_{10}$. Some of the nitrogen groups in the material synthesized can be further derivatized by adding Me groups by reacting with MeI to give an oligomer designated as $5C_{12}PEI_{10}Me$. The material obtained may contain primary, secondary, tertiary and quaternary nitrogen. The material can also be reacted with 2-bromoethyl methyl ether to afford a compound designated as $5C_{12}PEI_{10}CH_2CH_2OMe$. The amount of 2-bromoethyl methyl ether reacted will depend on desired molecular properties.

Visible Wettability Tests

Wettability tests were performed to compare the wettability of surfactants prepared in accordance with Pathway 1 and 2 with conventional surfactants. In order to test the performance of these surfactants, several reference surfactants were also tested: HC2, 19N, TRI-S, PEN 88, SSO 21 (surfactants available from Halliburton Energy Services, Inc.), and solutions of potassium chloride (KCl).

50 mL aqueous solutions of several surfactants (1% surfactant solutions) were prepared, and to these solutions were added 10 $cm^3$ Oklahoma No. 1 sand. The sand was kept in the solution for a period of 30 minutes. The solution was decanted from the mixture and to the sand was added 50 mL hexane or refined kerosene. The surfactant solution was poured back into the sand and hexane mixture. The relative dispersibility, or tendency to form clumps, by sand both in hexane and an aqueous layer was observed by lifting out the sand in oil phase and allowing it fall back to water phase with the help of a spatula.

The results obtained from this test are shown in Table 1. The results show that some surfactants made the sand water wet, some surfactants made the sand oil wet and others made the sand partially water and partially oil wet. The table shows that when 1% surfactant solutions were used, Surfactants 1, 5, 12, 13, 19N produced oil-wet sand whereas surfactants 2, 3, 6, 10, 11, 14, 15, HC2 and TRI-S, give water wet sand. Surfactants 4, 7, 8, 9 and 16 give intermediate wet (or non wet) sand, as it clumped in both the water and hexane layers. Surfactant 9 was found to show slightly different behavior when anion was changed. It is possible that different organic counter ions, which are an integral part of the adsorbed surfactant may change the behavior of the surfactants.

Interestingly, when 0.4% surfactant solution was used for the same purpose, surfactants 1 and 2 behave as non-wet surfactants. Under the similar conditions, surfactants 3 and 5 behave respectively as water-wet and oil-wet surfactants. The change of wettability with concentration may be due to the formation of multilayers on the sand surface.

TABLE 1

Summary of visible sand wettability tests of several surfactants in 1% surfactant solution and 0.4% surfactant solution

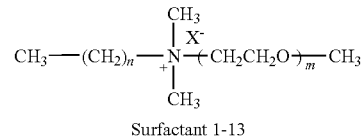

Surfactant 1-13

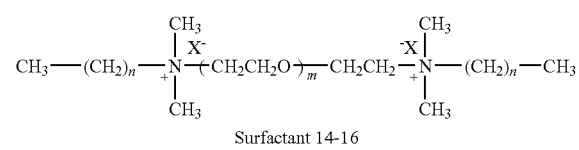

Surfactant 14-16

| Surfactant No. (1% solution) | n | m | X | In water | In Hexanes | Wettability |
|---|---|---|---|---|---|---|
| 1 | 7 | 1 | OTs | clumps | no clumping | Oil wet |
| 2 | 9 | 1 | OTs | no clumps | clumps | Water wet |
| 3 | 11 | 1 | OTs | no clumps | clumps | Water wet |
| 4 | 13 | 1 | OTs | clumps | clumps | Non wet |
| 5 | 17 | 1 | OTs | more clumps | no clumping | Oil wet |

TABLE 1-continued

| | | | | | | |
|---|---|---|---|---|---|---|
| 6 | 9 | 2 | OTs | no clumps | clumps | Water wet |
| 7 | 11 | 2 | OTs | more clumps | less clumps | Non wet |
| 8 | 13 | 2 | OTs | clumps | clumps | Non wet |
| 8 | 13 | 2 | OMs | clumps | clumps | Non wet |
| 9 | 17 | 2 | OMs | clumps | clumps | Non wet |
| 9 | 17 | 2 | OTs | more clumps | less clumps | Non wet |
| 10 | 9 | 3 | OTs | no clumps | clumps | Water wet |
| 11 | 11 | 3 | OTs | no clumps | clumps | Water wet |
| 12 | 13 | 3 | OTs | clumps | no clumps | Oil wet |
| 13 | 17 | 3 | OTs | clumps | no clumps | Oil wet |
| 14 | 7 | 3 | OTs | no clumps | clumps | Water wet |
| 15 | 9 | 3 | OTs | no clumps | clumps | Water wet |
| 16 | 13 | 3 | OTs | clumps slightly | clumps | Non wet |
| HC2 | — | — | — | no clumps | clumps | Water wet |
| 19N | — | — | — | clumps | no clumps | Oil wet |
| TRI-S | — | — | — | No clumps | clumps | Water wet |

| Surfactant No. (0.4% soln) | | | | In water | In Hexane | Wettability |
|---|---|---|---|---|---|---|
| 1 | 7 | 1 | OTs | clumps | clumps | Non wet |
| 2 | 9 | 1 | OTs | clumps | clumps | Non wet |
| 3 | 11 | 1 | OTs | No clumping | clumps | Water wet |
| 5 | 17 | 1 | OTs | clumps | no clumps | Oil wet |

Contact Angle and Surface Tension Measurement on Glass Surface

Contact angle and surface tension measurements were performed using the surfactants from the wettability tests. Aqueous surfactant solutions (0.2% by weight surfactant) were prepared and a clean glass slide was immersed into each of these solutions for 45 minutes. The glass slide was then washed 4 times with distilled water and gently wiped with a Kim wipe. To the slide was added a small drop of water and the contact angle of the drop was recorded immediately. Contact angle was measured using a Rame-Hart Goniometer (Model # A-100) and surface tension was measured using Kruss digital tensiometer (K10 ST). The contact angles measured on the glass surface (air-liquid interface) are given in Table 2. Surface tension was also measured of a 0.3% solution containing 2% KCl. The data is given in the Table 2.

These results show that surfactants 1, 4, 6, 7, 9, 11, 14, 19N, HC2 and 16 give rise to large contact angle (60° or greater). When these surfactants coat the silica surface of the slides they may impart enough hydrophobicity to yield large contact angles. Surprisingly, surfactant 2 (0.4%), which was found to give non wetting when tested using sand for the visible wettability tests, was found to yield very low contact angle. This may be due to low substantivity of this surfactant on the glass slide. Tri S, as expected, was found to be a very wetting surfactant. Surface tension measured for aqueous solutions of all the surfactants are in the range of 30-36 dynes/cm. These are very typical for most cationic surfactants.

TABLE 2

Contact angle of a water droplet on a glass surface treated with surfactant solution.

| Surfactant No. | Contact angle (°) | Surface tension |
|---|---|---|
| 1 | 61 | 34 |
| 2 | 45 | 31.66 |
| 3 | 45 | 31.66 |
| 4 | 60 | 32 |
| 5 | 61 | 32 |
| 6 | 66 | 33.66 |
| 7 | 62 | 31 |
| 8, mesylate | 55 | 32 |
| 8, tosylate | 53 | 35.66 |
| 8, tosylate | 52 | |
| 9, mesylate | 65 | |
| 9, tosylate | 65 | 34 |
| 10 | 57.5 | 33 |
| 11 | 64 | 35 |
| 12 | 62 | 33.33 |
| 13 | 56 | 34 |
| 14 | 61 | 31 |
| 15 | 52.5 | 32.83 |
| 16 | 62 | 32 |
| Tri S | 11 | 32 |
| Teflon tape | 90 | |
| 19 N | 66 | 35 |
| HC2 | 63 | 35 |
| 2% KCl | — | 72.4 |

CMC Measurement

Figure 2:
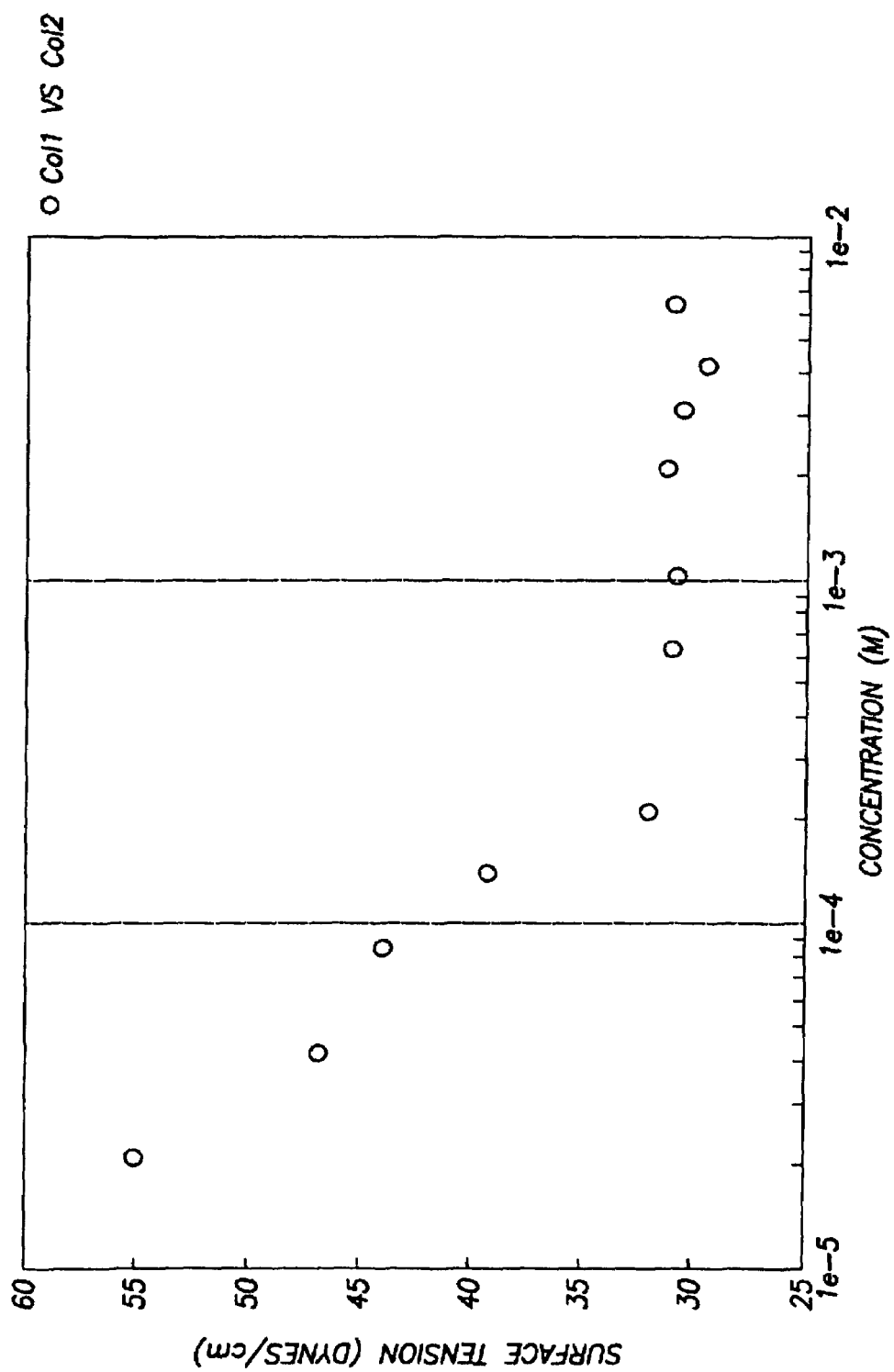
FIG. 2 shows the critical micelle concentration (CMC) determination of a surfactant by measuring surface tension.

Critical micelle concentration was measured using Kruss tensiometer for surfactant 4 and it was found to be $2.2 \times 10^{-4}$ M. The surface tension at different concentrations of surfactant was plotted to determine the CMC and shown in FIG. 2.

Imbibition Tests Using Packed Column of Porous Material

Figure 3:
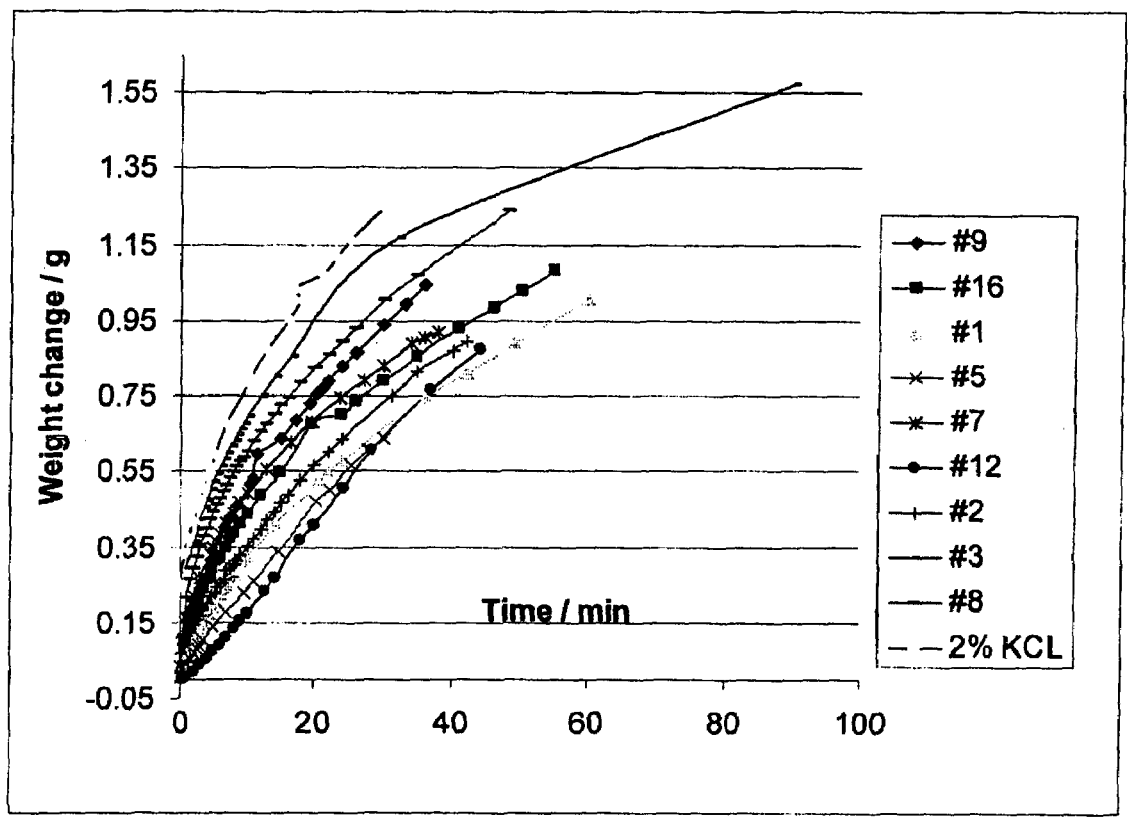
FIGS. 3, 4, and 5 show plots of imbibition of several surfactants in a porous silica material in a glass tube, plotted against time.
Figure 4:
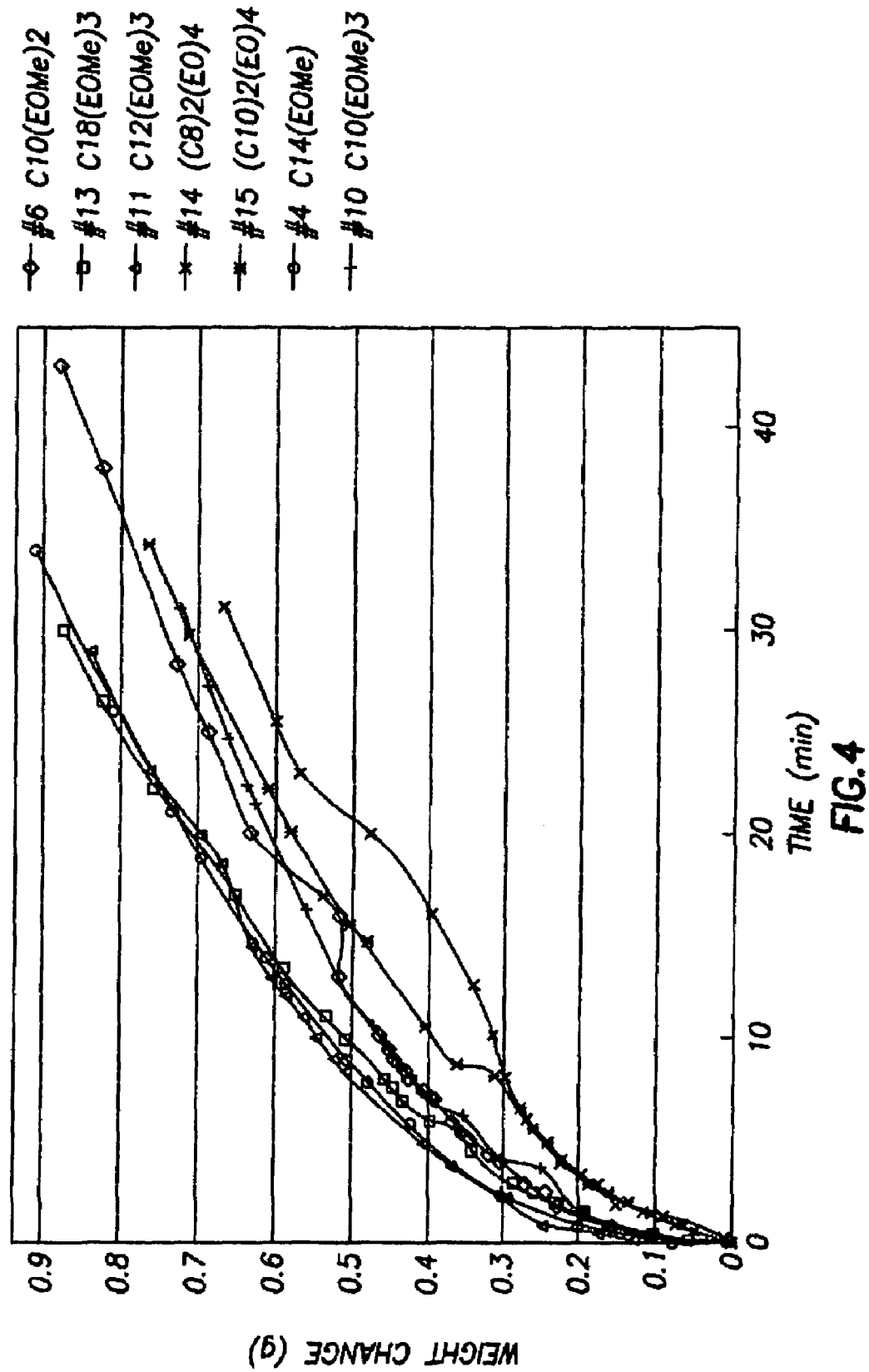

In order to determine the contact angle inside a porous material, the following test was performed. A glass tube (1 foot in length and internal diameter of ~4-6 mm) was packed with a homogeneous blend of 100 mesh Oklahoma No. 1 sand (75% by weight) and (25% by weight) SSA-1, a silica flour commercially available from Halliburton Energy Services, Inc. When an aqueous solution of surfactant (0.3%) containing KCl (2%) contacts the pack of this finely divided material, the solution imbibes into the pack as a front. The rate at which fluid is imbibed can be expressed by the following equation:

$$\frac{m^2}{t} = \frac{(\kappa\rho\phi^2)A^2\rho^2\gamma_{12}\cos\theta}{4\eta}$$

where m is the mass of imbibed liquid at a time of t, A is the cross-sectional area of the pack, p is the density of the fluid, $\gamma_{12}$ is the surface tension, $\theta$ is the contact angle, and $\eta$ is the viscosity of the liquid. The quantity $k r \phi^2$ can be determined easily by testing a liquid whose surface tension, contact angle, density and viscosity were all known. Once the $k r \phi^2$ is measured, the equation can be used to obtain the contact angle $\theta$. FIGS. 3 and 4 shows the plots where amount of water imbibed (m) for different surfactants was plotted against the time (t). Contact angle calculated from these plots are given in the Table 3.

TABLE 3

Contact angle

| Surfactant No. | Contact angle (o) |
|---|---|
| 1 | 74.36 |
| 2 | 78 |
| 3 | 38.07 |
| 4 | 62.54 |
| 5 | 84.29 |
| 6 | 69.55 |
| 7 | 66.76 |
| 8 | 53.65 |

TABLE 3-continued

Contact angle

| Surfactant No. | Contact angle (o) |
|---|---|
| 9 | 65.49 |
| 10 | 68.84 |
| 11 | 60.58 |
| 12 | 87 |
| 13 | 65 |
| 14 | 81 |
| 15 | 75.21 |
| 16 | 71.76 |

The contact angle measured in the porous medium shows that several surfactants can reach the contact angle close to 90°. As described earlier it is impossible to change the surface tension of an aqueous solution to zero but it is possible to increase the contact angle to 90° or greater. Thus, as contact angle approaches 90°, the capillary force holding any liquid inside capillary tube approaches zero. The results obtained from these experiments show that surfactants 1, 2, 5, 6, and 12, 14, 15, and 16 may be suitable for lowering capillary forces. Surprisingly, contact angle measurements show that surfactant 12 may be very suitable as a non wet surfactant. Surfactants 4, 6, 7, 9, 10, 11, and 13 may lower the capillary forces to a moderate value.

Figure 5:
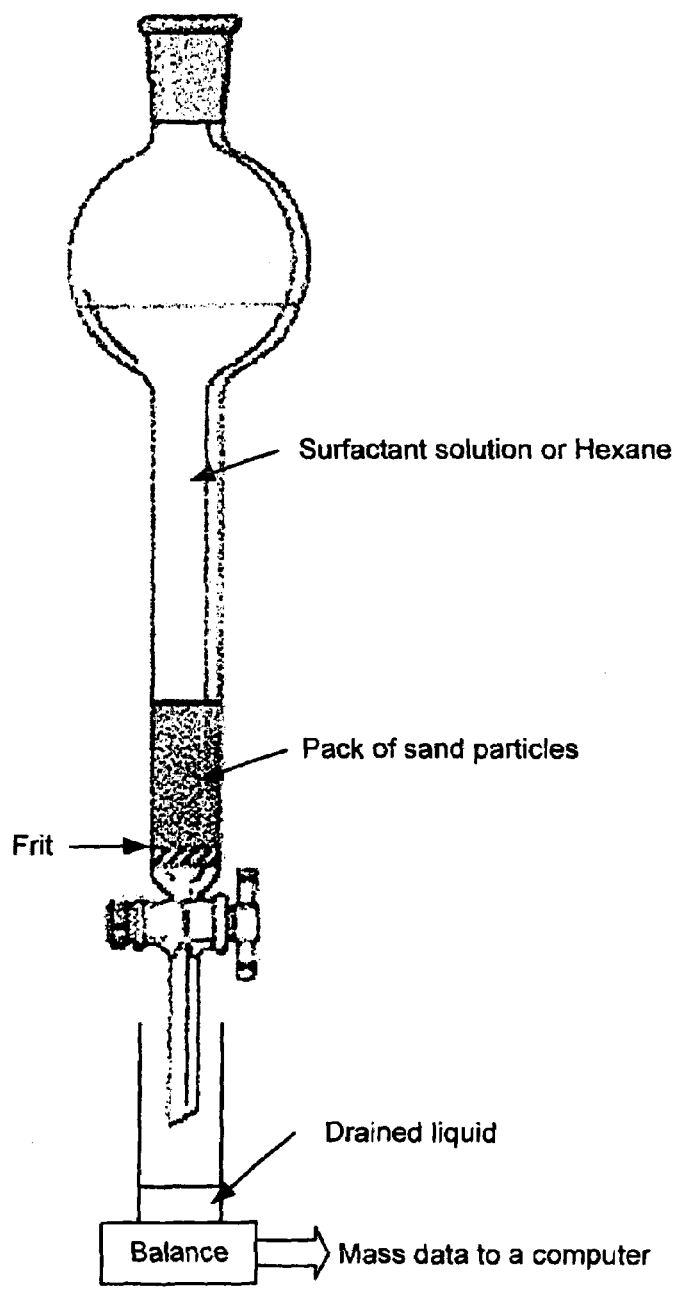

Contact angles inside the porous medium (in a mixture of Oklahoma No 1 and SSA-1) were also measured for surfactants containing one ethylene glycol group which is not methyl capped. The molecules behave as water wetting surfactants and data showed that most of these surfactants yield contact angles inside porous medium within ~60°. FIG. 5 shows how these surfactants behave in imbibing surfactant solution in the sand pack with time.

Figure 6:
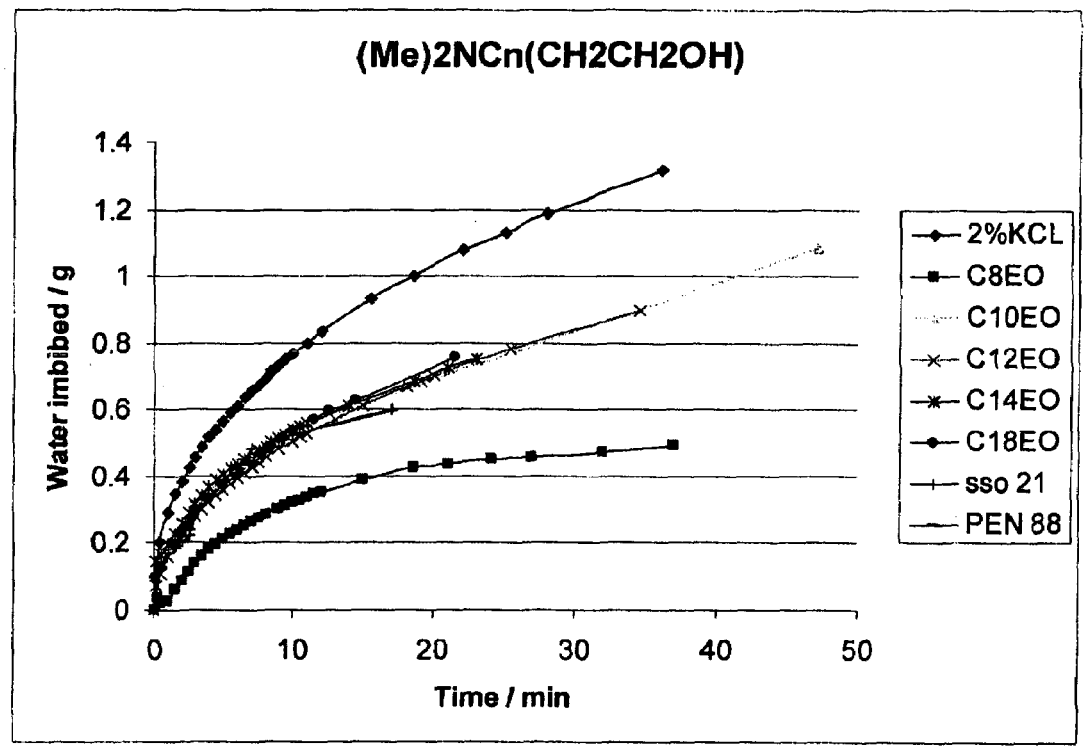
FIG. 6 is a diagram of a vertical glass column containing a large glass solvent reservoir and a drainage stopcock.

Vertical sand column tests were performed on several surfactants. A vertical glass column (with internal diameter ~1.25 cm, total height of about 21" and having a total volume of about 400 mls) containing a large glass solvent reservoir and a drainage stopcock was used for these experiments. This apparatus is shown in FIG. 6. No external pressure was applied to the sand column—the only pressure arises from the height of the column of fluid above the sand. The amount of each fluid passed through the sand column was measured using a balance connected to a computer. The column was filled with 25 g Oklahoma No. 1 sand (also known as SSA-2 sand) dispersed in about 100 mls water. The sand was allowed to settle for 15 minutes and then water was drained through the column until the sand pack was just covered by water. The rate of water flow through the pack was termed the initial water flow. 100 mL of 0.2% aqueous solution of a surfactant was then added to the column in a manner to give minimum disturbance to the sand pack and this was again passed through the vertical column until the last of the solution just reached the top of the sand pack. This fluid flow was termed the surfactant flow. Immediately after passing this 100 mL surfactant solution, 100 mL hexane or NORPAR 12 was placed on top of the sand pack and allowed to pass through the sand column, again until the last of the hexane or NORPAR 12 just covered the sand pack. This was termed hexane or NORPAR 12 flow. NORPAR 12 is a refined oil obtainable from Exxon and consists mainly of dodecane. Then 100 mL water was again added to the column giving minimum disturbance to the sand and this passed through the sand column (again until the last of the water just covered the sand pack). FIG. 7 shows the data for the experiment above using surfactant 3 solution as an example. It should be noted that hexane will not pass through the sand pack at all after the initial flow of water, if the sand is not treated with surfactant. Flow rates (initial) were calculated from the initial slopes using FIG. 7 and are shown in Table 4.

Initial rate measurement (Table 4) shows that flow rate of pure water through the sand column is greater than for any surfactant solution. Result also shows that hexane does not flow at all through the column immediately after passing of 100 mL of water through the column. The flow rate was found to be low with a hydroxyl terminated surfactant n-$C_{12}H_{25}N^+$(CH$_3$)$_2$(CH$_2$CH$_2$OH).$^-$OTs. As expected, the water wet or non wet surfactants may allow water to pass through the column easily. Surfactants No. 3, 4, 5, 7, and 8 show an enhanced ability to flow both hexane and water through the column. (Table 4)

TABLE 4

Initial flow rates of surfactant solution and hexane through a vertical sand column

| Surfactants No. | Initial flow rate when 0.2% surfactant solution or water flowed through the column (gs$^{-1}$) | Initial flow rate of hexane immediately after passing surfactant solution through the column (gs$^{-1}$) |
|---|---|---|
| Water | 0.239 | 0 |
| 1 | 0.1952 | 2.625 × 10$^{-3}$ |
| 2 | 0.224 | 9.134 × 10$^{-3}$ |
| 3 | 0.158 | 0.16 |
| 4 | 0.185 | 0.1127 |
| 5 | 0.201 | 0.144 |
| 6 | 0.20 | 0.1045 |
| 7 | 0.2 | 0.1151 |
| 8 | 0.226 | 0.142 |
| n-$C_{12}H_{25}N^+$(CH$_3$)$_2$(CH$_2$CH$_2$OH). | 0.127 | 0.089 |
| 4 | — | 0.0379, with NORPAR 12 |
| 14 | 0.197 | 0.0705 |
| 15 | 0.178 | 0.0397 |
| 16 | 0.176 | 7.56 × 10$^{-3}$ |

Flow Test on Polymeric Surfactants

Figure 8:
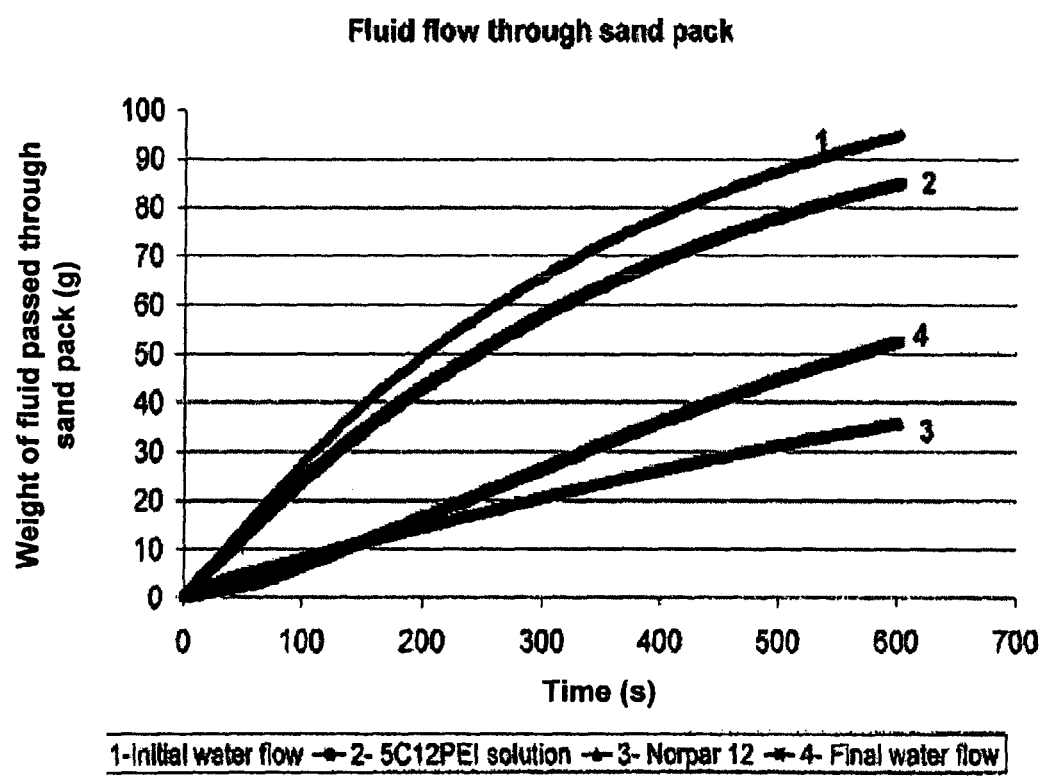
FIG. 8 shows a plot of flow rate of hexane (100 mL) through a small column of Oklahoma No. 1 sand. Hexane was passed immediately after passing of solutions comprising 0.2% of surfactants shown in FIG. 7.

Oligomers prepared as described in the Experimental section were dissolved in water and passed through SSA-2 sand columns as described in the previous paragraph. SSA-2 (25 g) was loaded into the column and water passed through—the initial ~40 mls giving the flow rate for pure water. A solution of 100 mls of $C_{12}PEI_{10}$ (0.2%) was passed through the column to coat the sand; this was followed by 100 mls of NORPAR 12 and then a further 100 mls of water. The results are shown in FIG. 8.

Figure 9:
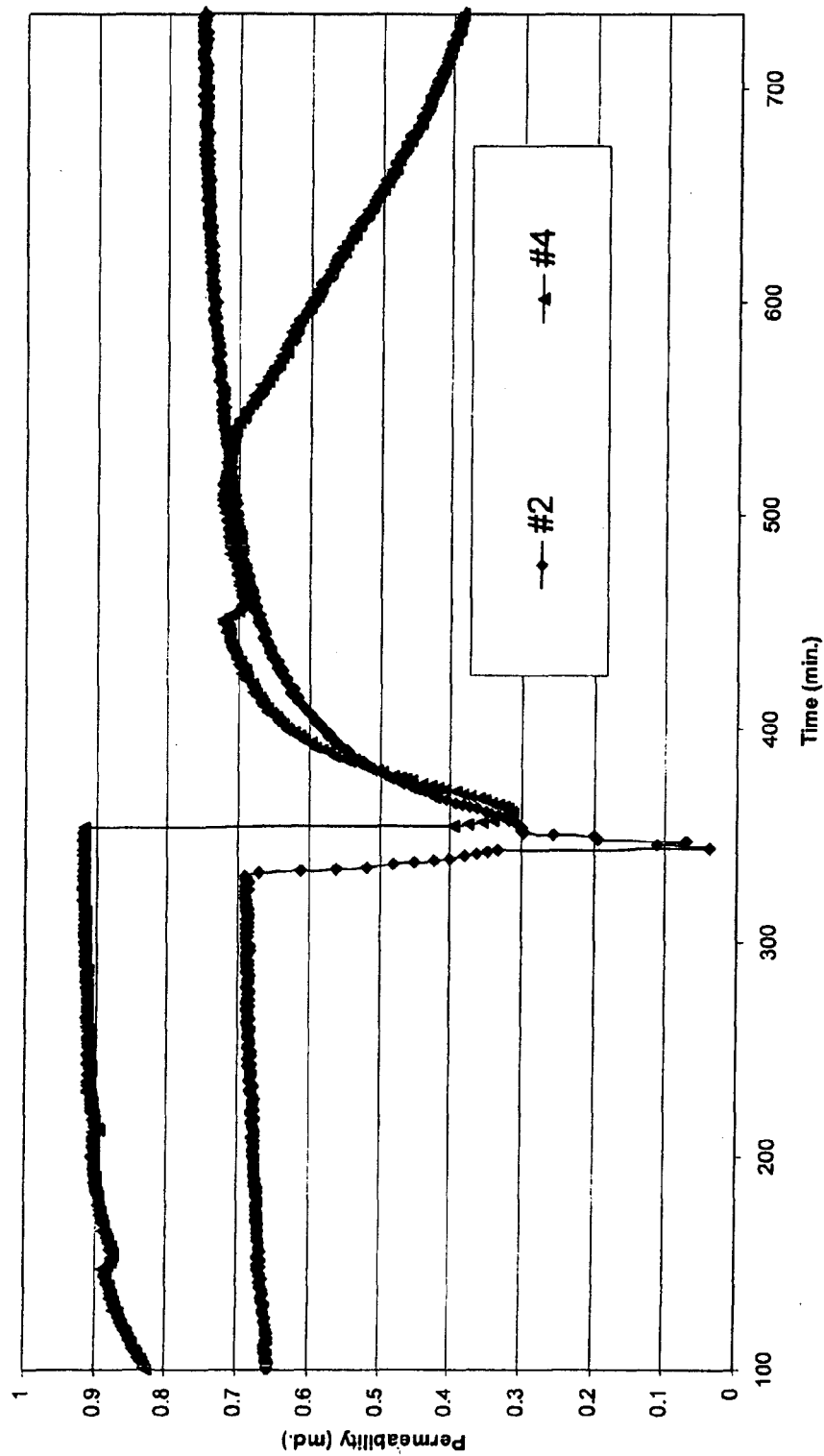
FIG. 9 shows a plot of regain to oil permeability on Ohio Sandstone for several surfactants.
Figure 10:
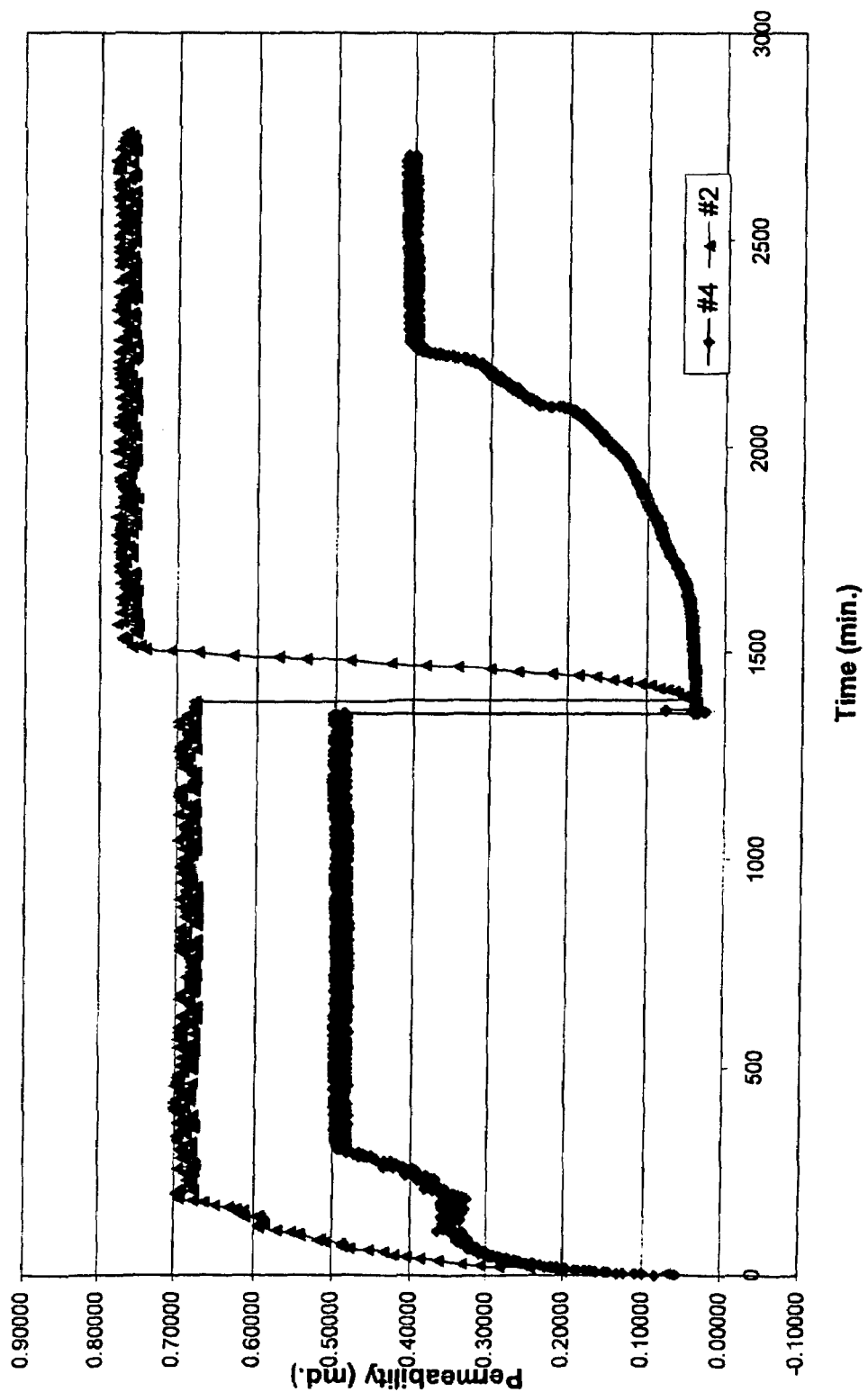
FIG. 10 shows a plot of regain to dry gas permeability on Ohio Sandstone for several surfactants.

Surfactants 2 and 4 also underwent core flow tests. Ohio Sandstone cores were used for core flow tests. Both regain permeability to oil and regain permeability to dry gas were measured for a few surfactants. Experiments with liquids were performed under a constant flow rate whereas those for gas flow were performed at constant pressure of gas. For the regain permeability to oil test, cores initially were treated with kerosene then subsequently treated with 5 pore volumes of API brine and then again with kerosene until a stabilized permeability to kerosene production was obtained. Oil regain permeability changed from 0.683 md to 0.757 md when the core was treated with surfactant 2 solution (0.5% and 2% KCl), which corresponds to 110% regain permeability to oil. Regain permeability to dry gas was obtained similarly, except that gas was flowed in the reverse direction of the treating fluid. The data showed that surfactant 2 enhanced regain permeability to both oil and gas whereas, surfactant 4 was not as effective for both oil or gas. FIG. 9 shows the regain permeability to oil and FIG. 10 shows the regain permeability to gas data for surfactants 2 and 4. Table 5 summarizes the data obtained from the regain oil and gas permeability studies, showing that both surfactants give good regain, with surfactant 2 being better than surfactant 4.

TABLE 5

Summary of core flow tests

| Surfactants | Test Temp (° F.) | Flow rate (mL/min) | dp (psi) | Core | Core length (cm) | Core diameter (cm) | Oil perm regain (%) | Oil perm regain (%) |
|---|---|---|---|---|---|---|---|---|
| #2 (oil regain) | 200 | 2 | 500 | Ohio Sandstone | 6.528 | 2.507 | 110 | — |
| #2 (gas regain) | 200 |  |  | Ohio Sandstone | 6.714 | 2.508 | — | 112 |
| #4 (oil regain) | 200 | 2 | 500 | Ohio Sandstone | 6.693 | 2.513 | 36 | — |
| #4 (gas regain) | 200 |  |  | Ohio Sandstone | 6.723 | 2.517 | — | 87 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
    introducing a treatment fluid into a subterranean formation;
        wherein the treatment fluid comprises a carrier fluid and a cationic surfactant;
            wherein the cationic surfactant comprises a cationic head group; a hydrophobic group that is a saturated or unsaturated, branched or straight chain alkyl group comprising about 6 to about 22 carbons; and a polar group attached to the cationic head group that comprises an amine or a sulfide but not an ether.

2. The method of claim 1, wherein the cationic surfactant reduces the occurrence of at least one of water blocks or gas condensates in a portion of the subterranean formation.

3. The method of claim 1, wherein the cationic surfactant is adsorbed on a rock surface in a portion of the subterranean formation.

4. The method of claim 1, further comprising producing a fluid comprising a gas from the subterranean formation.

5. The method of claim 1, wherein the cationic surfactant has an initial flow rate through a vertical sand column in a range of about 0.5 ml/sec to about 0.1 ml/sec.

6. The method of claim 1, wherein the cationic surfactant has a structure of

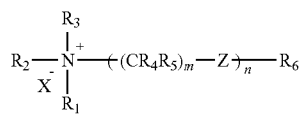

wherein $X^-$ is an anion;
wherein $R_1$ and $R_2$ are the same or different and are selected from the group consisting of hydrogen and an alkyl group comprising 1 to about 6 carbons;
wherein $R_3$ comprises a branched or unbranched hydrophobic group comprising about 6 to about 22 carbons that is selected from the group consisting of an alkyl group, an alkenyl group, an alkyl amide, an alkenyl amide, an alkyl ether, and an alkenyl ether;
wherein $R_4$ and $R_5$ are the same or different and are selected from the group consisting of hydrogen and an alkyl group comprising 1 to about 6 carbons;
wherein $R_6$ is selected from the group consisting of hydrogen, an alkyl group comprising 1 to about 6 carbons, and $-(CR_4R_5)_m N^+ R_1 R_2 R_3 X^-$;
wherein m and n are about 1 to about 6; and
wherein Z is selected from the group consisting of NH and S.

7. The method of claim 1, wherein the cationic surfactant has a structure of

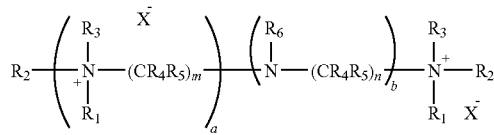

wherein $X^-$ is an anion;
wherein $R_1$ and $R_2$ are the same or different and are selected from the group consisting of hydrogen, an alkyl group comprising 1 to about 6 carbons, end capped ethylene oxide and its derivatives, and end capped propylene oxide and its derivatives;
wherein $R_3$ and $R_6$ are the same or different and comprise a linear or branched hydrophobic group comprising about 6 to about 22 carbons that is selected from the group consisting of an alkyl group, an alkenyl group, an alkyl amide and an alkenyl amide;

wherein R₄ and R₅ are the same or different and are selected from the group consisting of hydrogen and an alkyl group comprising 1 to about 6 carbons;

wherein m and n are about 1 to about 6; and wherein a and b are from about 1 to about 200 and the ratio of a to b is about 1:4 to about 4:1.

8. The method of claim 1, wherein the cationic surfactant comprises about 0.01% to about 10% of the treatment fluid by weight.

9. The method of claim 1, wherein the subterranean formation comprises coal bed methane.

10. The method of claim 1, wherein the treatment fluid is introduced into the subterranean formation at or above a pressure sufficient to create or enhance one or more fractures therein.

11. The method of claim 1, wherein the treatment fluid further comprises a plurality of proppant particulates.

12. A method comprising:
   introducing a treatment fluid into a subterranean formation;
      wherein the treatment fluid comprises a carrier fluid and a cationic surfactant;
      wherein the cationic surfactant has a structure of

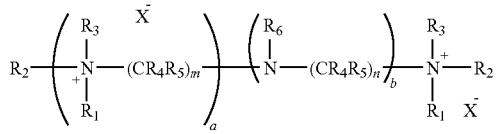

wherein X⁻ is an anion;

wherein R₁ and R₂ are the same or different and are selected from the group consisting of hydrogen, an alkyl group comprising 1 to about 6 carbons, end capped ethylene oxide and its derivatives, and end capped propylene oxide and its derivatives;

wherein R₃ and R₆ are the same or different and comprise a linear or branched hydrophobic group comprising about 6 to about 22 carbons that is selected from the group consisting of an alkyl group, an alkenyl group, an alkyl amide and an alkenyl amide;

wherein R₄ and R₅ are the same or different and are selected from the group consisting of hydrogen and an alkyl group comprising 1 to about 6 carbons;

wherein m and n are about 1 to about 6; and wherein a and b are from about 1 to about 200 and the ratio of a to b is about 1:4 to about 4:1.

13. The method of claim 12, wherein the treatment fluid is introduced into the subterranean formation at or above a pressure sufficient to create or enhance one or more fractures therein.

14. The method of claim 12, wherein the cationic surfactant comprises about 0.01% to about 10% of the treatment fluid by weight.

15. The method of claim 12, wherein the subterranean formation comprises coal bed methane.

16. The method of claim 12, wherein the treatment fluid further comprises a plurality of proppant particulates.

17. A method comprising:
   introducing a treatment fluid into a subterranean formation;
      wherein the treatment fluid comprises a carrier fluid and a cationic surfactant;
      wherein the cationic surfactant has a structure of:

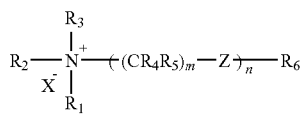

wherein X⁻ is an anion;

wherein R₁ and R₂ are the same or different and are selected from the group consisting of hydrogen and an alkyl group comprising 1 to about 6 carbons;

wherein R₃ comprises a branched or unbranched hydrophobic group comprising about 6 to about 22 carbons that is selected from the group consisting of an alkyl group, an alkenyl group, an alkyl amide, an alkenyl amide, an alkyl ether, and an alkenyl ether;

wherein R₄ and R₅ are the same or different and are selected from the group consisting of hydrogen and an alkyl group comprising 1 to about 6 carbons;

wherein R₆ is an alkyl group comprising 1 to about 6 carbons;

wherein m and n are about 1 to about 6; and wherein Z is selected from the group consisting of O and S.

18. The method of claim 17, wherein the cationic surfactant comprises about 0.01% to about 10% of the treatment fluid by weight.

19. The method of claim 17, wherein the subterranean formation comprises coal bed methane.

20. The method of claim 17, wherein the treatment fluid further comprises a plurality of proppant particulates.

21. The method of claim 17, wherein the treatment fluid is introduced into the subterranean formation at or above a pressure sufficient to create or enhance one or more fractures therein.

22. The method of claim 17, wherein the cationic surfactant has a structure of

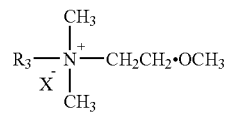

wherein R₃ comprises a saturated or unsaturated alkyl group that comprises about 8 to about 14 carbons.

23. A treatment fluid comprising:

a carrier fluid; and a cationic surfactant;
   wherein the cationic surfactant comprises a cationic head group; a hydrophobic group that is a saturated or unsaturated, branched or straight chain alkyl group comprising about 6 to about 22 carbons; and a polar group attached to the cationic head group that comprises an amine or a sulfide but not an ether.

24. A treatment fluid comprising:

a carrier fluid; and a cationic surfactant;
   wherein the cationic surfactant has a structure of:

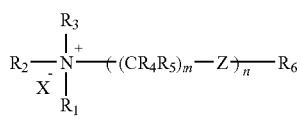

wherein $X^-$ is an anion;

wherein $R_1$ and $R_2$ are the same or different and are selected from the group consisting of hydrogen and an alkyl group comprising 1 to about 6 carbons;

wherein $R_3$ comprises a branched or unbranched hydrophobic group comprising about 6 to about 22 carbons that is selected from the group consisting of an alkyl group, an alkenyl group, an alkyl amide, an alkenyl amide, an alkyl ether, and an alkenyl ether;

wherein $R_4$ and $R_5$ are the same or different and are selected from the group consisting of hydrogen and an alkyl group comprising 1 to about 6 carbons;

wherein $R_6$ is an alkyl group comprising 1 to about 6 carbons;

wherein m and n are about 1 to about 6; and wherein Z is selected from the group consisting of O and S.

* * * * *